(12) United States Patent
Tamura

(10) Patent No.: US 6,177,878 B1
(45) Date of Patent: Jan. 23, 2001

(54) METER DRIVING DEVICE

(75) Inventor: Shigeaki Tamura, Niigata (JP)

(73) Assignee: Nippon Seiki Co., Ltd., Niigata (JP)

( * ) Notice: Under 35 U.S.C. 154(b), the term of this patent shall be extended for 0 days.

(21) Appl. No.: 09/068,004

(22) PCT Filed: Jun. 19, 1997

(86) PCT No.: PCT/JP97/02125

§ 371 Date: Apr. 29, 1998

§ 102(e) Date: Apr. 29, 1998

(87) PCT Pub. No.: WO98/09137

PCT Pub. Date: Mar. 5, 1998

(30) Foreign Application Priority Data

Aug. 29, 1996 (JP) .................................................. 8-227256

(51) Int. Cl.[7] .................................................. G05B 23/02
(52) U.S. Cl. .................................. 340/825.07; 307/10.1; 340/517; 340/488; 340/310
(58) Field of Search ................ 340/825.07, 517, 340/478, 471, 475, 488, 870.39, 459, 870.37, 425.5, 310; 307/10.1, 108

(56) References Cited

U.S. PATENT DOCUMENTS 4,119,948 * 10/1978 Ward et al. .......................... 340/151
5,154,617 10/1992 Suman et al. .

FOREIGN PATENT DOCUMENTS

| 0 871 015 | 10/1998 | (EP) . |
| 2 276 038 | 9/1994 | (GB) . |
| 4-39531 | 9/1992 | (JP) . |
| 6-276571 | 9/1994 | (JP) . |
| 6-276644 | 9/1994 | (JP) . |
| 7-047869 | 2/1995 | (JP) . |
| 7-47869 | 2/1995 | (JP) . |
| 7-096774 | 4/1995 | (JP) . |
| 7-96774 | 4/1995 | (JP) . |
| 7-203553 | 8/1995 | (JP) . |

* cited by examiner

Primary Examiner—Michael Horabik
Assistant Examiner—Anthony A. Asongwed
(74) Attorney, Agent, or Firm—McDermott, Will & Emery

(57) ABSTRACT

Electronic components other than a meter unit are classified and integrated into plural electronic component units. Input/output ports (attach-and-detach means) permitting the detachable electronic component units to be mounted to and detached from the meter unit are provided. This meter unit includes a meter block having a control portion and a power supply portion. The control portion controls the electronic component units. The power supply portion supplies electric power to the electronic component units. The electronic component units are controlled and electrically energized via the input/output ports.

5 Claims, 4 Drawing Sheets

2a ... DISPLAY PORTION
2b ... CONTROL PORTION
2c ... POWER SUPPLY PORTION
3a,4a ... INPUT CIRCUIT
3b,4b ... OUTPUT CIRCUIT

METER DRIVING DEVICE

TECHNICAL FIELD

The present invention relates to a vehicular meter driving device and, more particularly, to integration of electronic component units other than the meter.

BACKGROUND ART

In a vehicle, various electronic components and devices, such as illuminated key entry system, defogger timer, seat belt warning system, light turning-off reminding warning system, key takeout reminding warning system, power door lock, and keyless entry system, are independently installed and distributed. These electronic components are electrically connected with a meter unit mounted in front of the driver's seat. The electronic components are controlled by system means such as a microcomputer incorporated in the meter unit in accordance with a program previously stored in a ROM of the meter unit. The state of the vehicle detected by the electronic components is displayed on the meter unit if necessary (for example, see Japanese Unexamined Patent Publication No. 203553/1995.)

Integration of the distributed independent electronic components is considered as means for achieving cost reduction. The combination of the required electronic components differs according to the vehicular specifications for specific climatic areas or the vehicle grade. Therefore, if electronic components are integrated simply according to the combination, then the number of variations increases. Consequently, large cost reduction cannot be expected.

Japanese Unexamined Patent Publication No. 276571/1994 discloses a multiplexed transmission device for a vehicular electric system. This multiplexed transmission device is separate from electronic components, unlike the prior art device. Since these two kinds of systems can be separately developed and manufactured, it is possible to prevent the electronic components and the multiplexed transmission device from increasing in total number. Even with this structure, however, the number of variations described above cannot be sufficiently decreased.

DISCLOSURE OF THE INVENTION

The above object is achieved in accordance with the teachings of the invention by a meter driving device comprising electronic component units and attach-and-detach means for attaching and detaching a meter unit to and from the electronic component units that are fabricated by classifying electronic parts other than the meter unit into plural integrated electronic component units. A control portion for controlling the electronic component units and a power supply portion for electrically energizing the electronic component units are mounted in the meter unit. The electronic component units is controlled and electrically energized via the attach-and-detach means. The number of variations can be reduced greatly. This can greatly contribute to a decrease in the cost.

In another feature of the invention, identification means are mounted which permit the electronic component units described above to identify the kinds of the electronic component units by itself. Therefore, any special operation is not necessary in production lines. This immensely contributes to simplification of the process.

BEST MODE FOR CARRYING OUT THE INVENTION

Embodiments of the present invention are hereinafter described with reference with the accompanying drawings.

Figure 1:
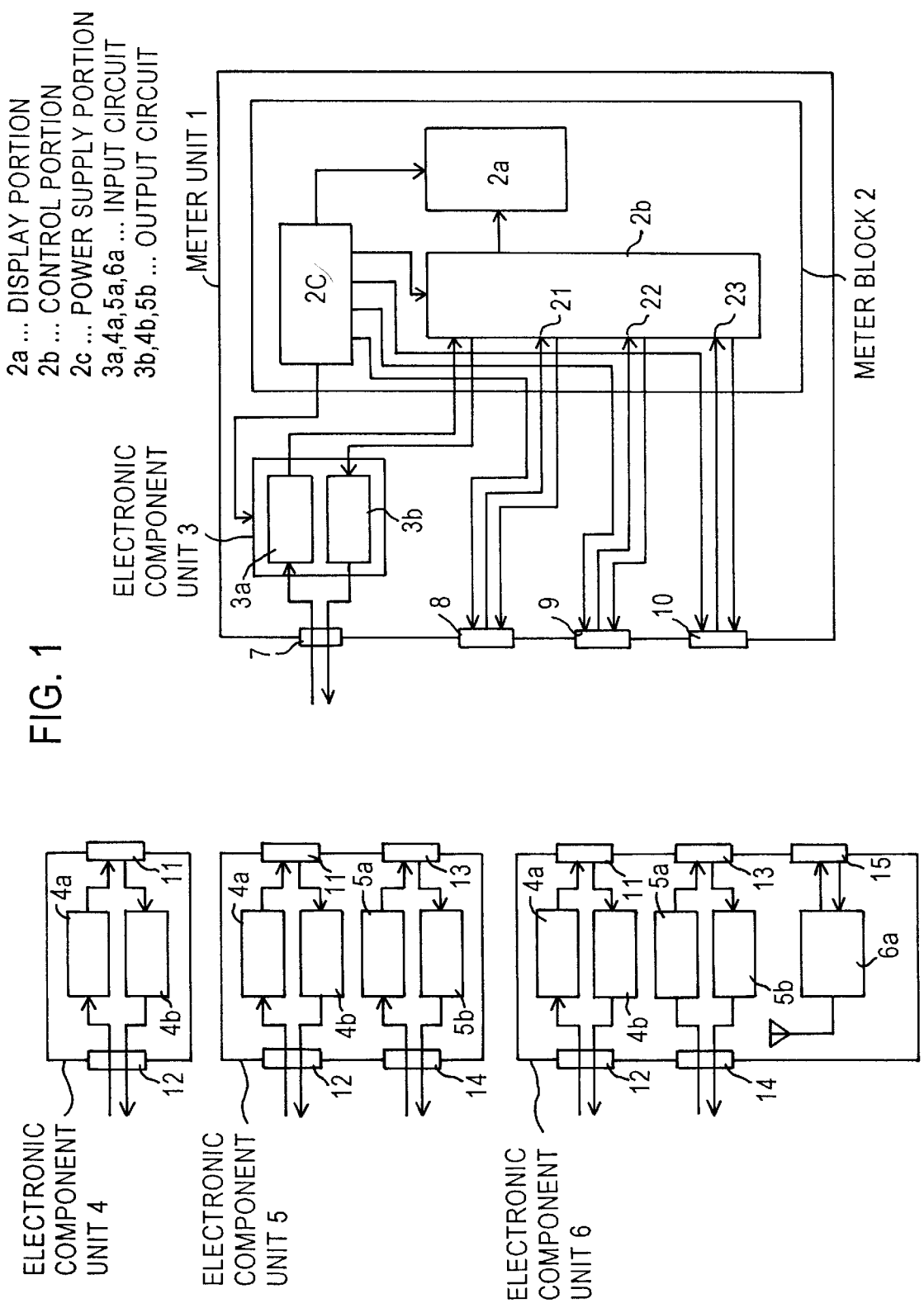
FIG. 1 is a block diagram showing the configuration of an embodiment of the present invention.

FIG. 1 is a block diagram showing the configuration of an embodiment. Indicated by 1 is a function-integrated meter unit. A meter block 2 is mounted in the meter unit 1. Plural electronic components are classified and integrated into electronic component units 3–6. Input/output ports 7–15 are mounted in the meter unit 1 and in the electronic component units 3–6 and have a plug-in connector structure such as a connector. These input/output ports act also as attach-and-detach means.

The meter block 2 incorporates a display portion 2a, a control portion 2b for driving and controlling the display portion 2a, and a power supply portion 2c for supplying electric power to these portions 2a, 2b. —The display portion 2a displays the vehicle speed, the engine speed, and other information. The control portion 2b consists of a microcomputer. The power supply portion 2c is electrically connected with the vehicle battery (not shown).

In the present embodiment, plural electronic components are classified and integrated into four electronic component units 3–6, for example. For instance, the electronic component unit 3 integrates various electronic components such as seat belt warning system, light turning-off reminding warning system, and key takeout reminding warning system. The unit 3 has an input circuit 3a and an output circuit 3b. The input circuit 3a comprises interface circuits for the ignition switch, a seat belt switch, a light switch, a door switch, and so on. The output circuit 3b receives electric power from the power supply portion 2c, activates a warning means such as a buzzer, and provides a desired display on the display portion 2a of the meter block 2.

The electronic component unit 4 is an integration of electronic components forming an illuminated entry system and a defogger timer, respectively, and has an input circuit 4a and an output circuit 4b. The input circuit 4a is an interface circuit for a door switch, a defogger switch, or the like. The output circuit 4b is a driver circuit for supplying electric power from the power supply portion 2c to a light source or to a heating coil.

The electronic component unit 5 is an integration of the electronic component unit 4 with an electronic component consisting of a power door lock. The component unit 5 has an input circuit 5a and an output circuit 5b. The input circuit 5a is an interface circuit for a door lock switch, a key cylinder switch, or the like. The output circuit 5b is a driver circuit receiving electric power from the power supply portion 2c and driving the door lock actuator.

The electronic component unit 6 is an integration of the electronic component units 4, 5 with an electronic component consisting of a keyless entry system. The component unit 6 has an input circuit 6a that is an interface circuit for an antenna or a receiver circuit that receives a signal emitted by the driver or other person. A driver circuit receives electric power from the power supply portion 2c and opens and closes the door lock. Since this driver circuit acts also as the output circuit 5b, any dedicated driver circuit is not mounted.

Figure 2:
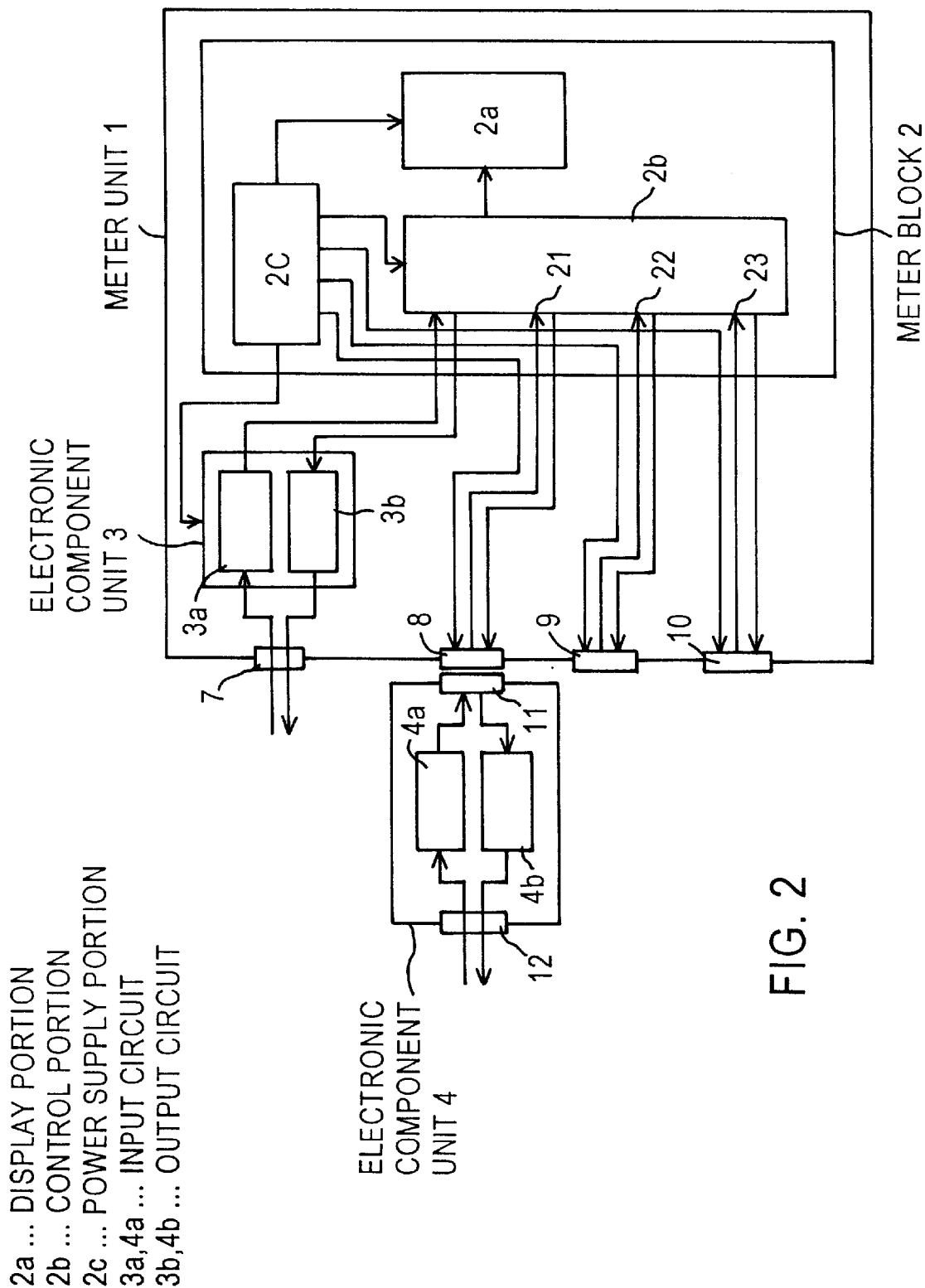
FIG. 2 is a block diagram illustrating an example of combination in the above-described embodiment.
Figure 3:
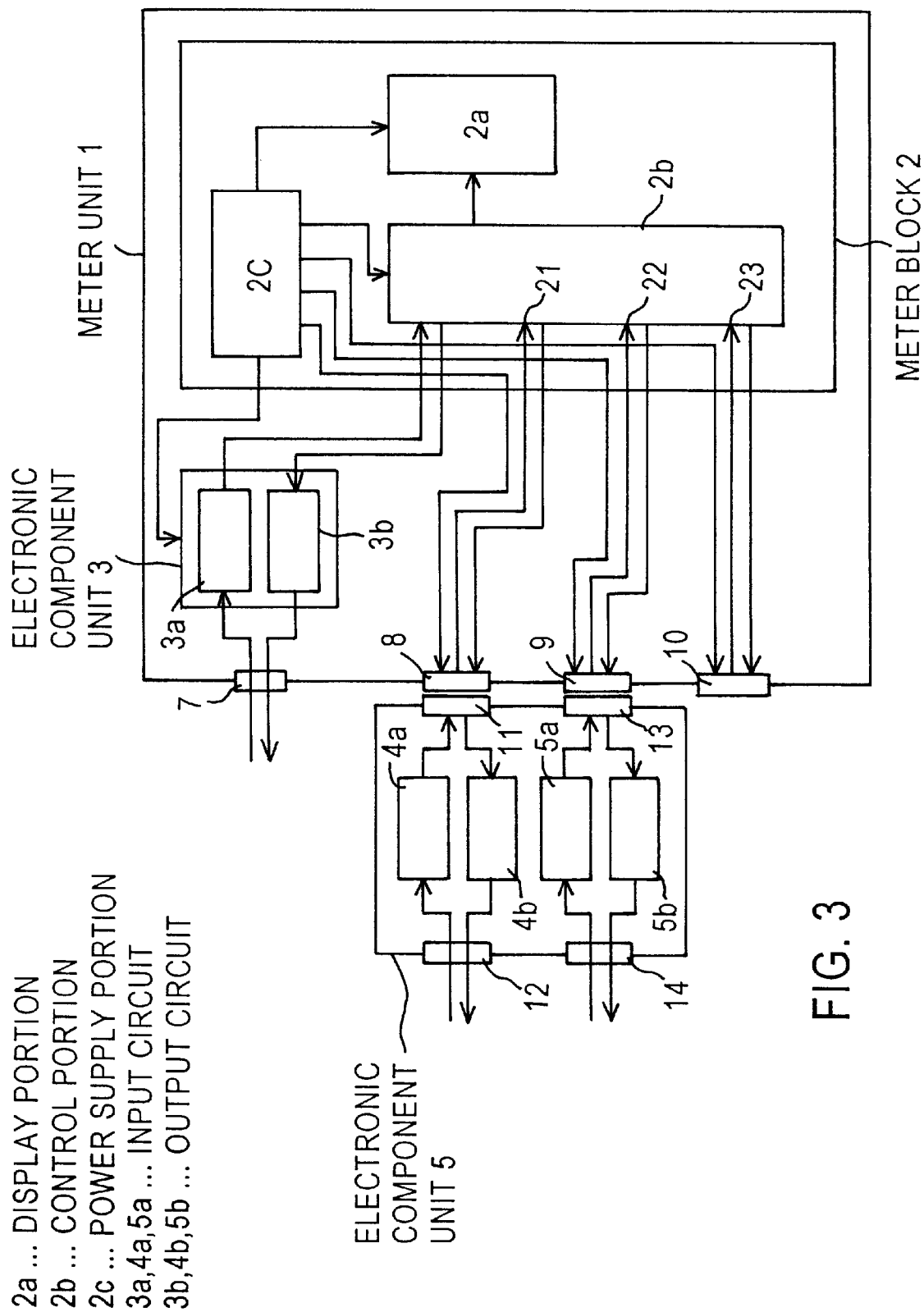
FIG. 3 is a block diagram illustrating another example of combination in the above-described embodiment.
Figure 4:
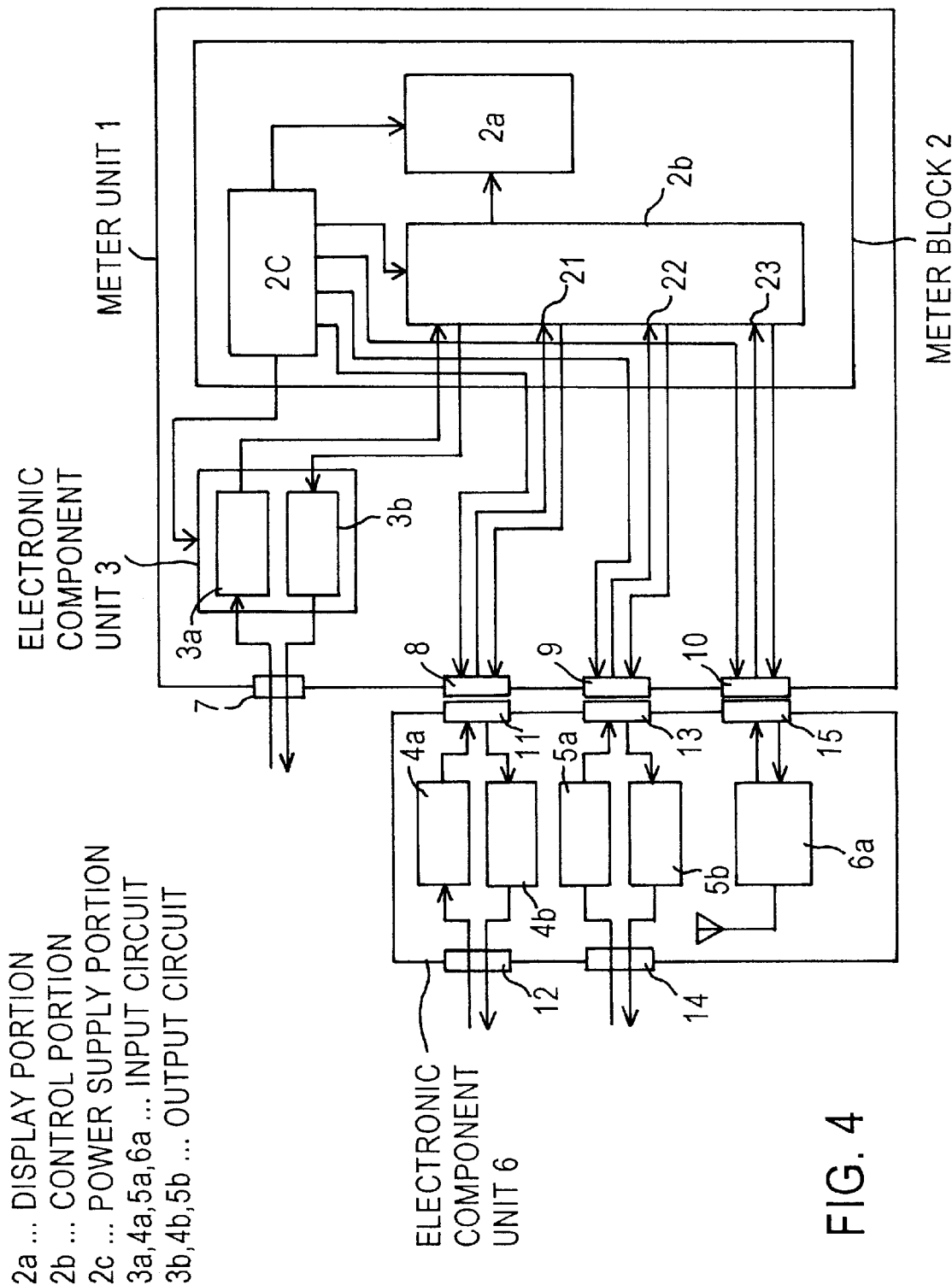
FIG. 4 is a block diagram illustrating a further example of combination in the above-described embodiment.

Of these four kinds of electronic component units 3–6, the electronic component unit 3 is built into the meter unit 1, since it is used for every kind of vehicle. Its input/output ports 7 are exposed from the meter unit 1. The three remaining electronic component units 4–6 are appropriately selected in the production lines according to the vehicular specifications for specific climatic areas or the vehicle grade, and are mounted to the meter unit 1 via the junction block 7. In the case of the electronic component unit 4, the input/output port 11 of the electronic component unit 4 is connected to the input/output port 8 of the meter unit 1 in one touch (see FIG. 2). In the case of the electronic component unit 5, input/output ports 11, 13 of the electronic component unit 5 are connected to the input/output ports 8, 9 of the meter unit 1 in one touch (see FIG. 3). In the case of the electronic component unit 6, input/output ports 11, 13, and 15 of the electronic component unit 6 are connected to the input/output ports 8, 9, 10 of the meter unit 1 in one touch (see FIG. 4). Thus, the electronic component units 4–6 are controlled and electrically energized by the control portion 2b and the power supply portion 2c of the meter unit 1 via the input/output ports 8–11, 13, and 15 that are attach-and-detach means.

Owing to this structure, it is necessary to prepare only four kinds of electronic component units 3–6. The number of variations can be reduced greatly. This is effective in reducing the cost. In particular, 7 kinds of electronic components are used in the present embodiment. There are three kinds of electronic component units 3, two kinds of electronic component units 4, one kind of electronic component unit 5, and one kind of electronic component unit 6. Where at least one kind of electronic component is used according to the vehicular specifications for specific climatic areas or the vehicle grade, there exist 127 combinations of used electronic component units. If the electronic components of the electronic component units 3 incorporated in the meter unit 1 are excluded, there exist 15 variations. In the present embodiment, however, there exist only 3 variations. It will be understood that the number of variations is much fewer.

Even if the same electronic component unit 6 is mounted, the power door lock included in the electronic component unit 5 may be made unnecessary according to the kind of vehicle. Assume that this situation takes place. A separate electronic component unit that consists of the electronic component unit 4 integrated with the electronic component of a keyless entry system is prepared, though this increases the number of variations. Where the kinds of vehicles are fewer, the cost can be more effectively reduced by making use of the electronic component unit 6 including electronic components not used.

The control portion 2b monitors the input/output ports 8–10 of the meter unit 1 and identifies the electronic component unit mounted to the meter unit 1. Specifically, when any one of the electronic component units 4–6 is connected with the meter unit 1 via the input/output port 11, 13, or 15, the potential at the input terminals 21–23 of the control portion 2b linked to the connected input/output ports 8–10 varies from high to low level. The meter unit 1 monitors their potentials using these input terminals 21–23 as identification means. In this way, the meter unit can identify the kinds of the electronic component units 4–6 by itself.

The identification means are not limited to the above-described input terminals 21–23. Alternatively, one may gain access to the control portion 2a of the meter block 2 from outside the meter unit 1 when or after any appropriate one of the electronic component units 4–6 is selected and mounted to the meter unit 1 in the manufacturing lines. Of course, however, designing the meter unit 1 to act as means capable of identification by itself as in the above-described embodiment immensely contributes to simplification of the manufacturing process line.

It is to be understood that the above-described embodiment merely gives one example of the invention and that the invention is not limited thereto. For example, electronic components classified and integrated as electronic component units are not limited to those described in the above embodiment. Obviously, the combination may be appropriately selected according to the kind of vehicle.

The present invention classifies and integrates electronic components other than the meter unit into plural kinds as electronic component units. Attach-and-detach means are mounted to permit the electronic component units to be mounted to and detached from the meter unit. A control portion for controlling the electronic component units and a power supply portion for supplying electric power to the electronic component units are mounted in the meter unit. The electronic component units are controlled and electrically energized via the attach-and-detach means. The integration of the electronic components reduces the number of electronic component units to be prepared. In consequence, the number of variations can be made much fewer than conventional. This can greatly contribute to a decline in the cost.

Identification means permitting the meter unit to identify the kinds of the electronic component units by itself are mounted. Hence, any special operation is not necessary in the production lines. This can greatly contribute to simplification of the process steps.

Industrial Applicability

In this way, the present invention is adapted for a meter driving device having many kinds of electronic components that are used in a combination that varies according to the vehicular specifications for specific climatic areas or the vehicle grade.

I claim:

1. A meter driving device comprising:

a meter unit;

electronic components classified and integrated into plural electronic component units;

attach-and-detach means permitting the electronic component units to be mounted to and detached from said meter unit, said electronic component units being controlled and electrically energized via said attach-and-detach means;

a control portion for controlling said electronic component units, said control portion being mounted in said meter unit; and a power supply portion for supplying electric power to said electronic component units, said power supply portion being mounted in said meter unit, wherein there are further provided identification means for permitting said meter unit to identify the kinds of said electronic component units by itself.

2. A meter driving device according to claim 1, wherein the identification means includes means for identifying electronic component units by measuring a potential of an attached electronic component unit.

3. A meter driving device comprising:

a meter unit having a plurality of input/output ports;

electronic components classified and integrated into plural electronic component units;

attach-and-detach means permitting the electronic component units to be mounted to and detached from said meter unit, said electronic component units being controlled and electrically energized via said attach-and-detach means;

a control portion mounted in said meter unit for controlling said electronic component units, and a power supply portion mounted in said meter unit for supplying electric power to said electronic component units, wherein the control portion monitors the input/output ports of the meter unit to identify the electronic component units attached to the meter unit.

4. A meter driving device according to claim 3, wherein the control portion further comprises a plurality of input terminals corresponding to input/output ports of the meter unit.

5. A meter driving device according to claim 4, wherein the control portion monitors a potential of the input terminals of the control portion to identify the electronic component units mounted to the meter unit through the input/output ports.

* * * * *